US011678347B2

(12) United States Patent
Silverman et al.

(10) Patent No.: US 11,678,347 B2
(45) Date of Patent: Jun. 13, 2023

(54) NEED-BASED ANTENNA SWITCHING IN WI-FI ANGLE-OF-ARRIVAL LOCATIONING

(71) Applicant: Cisco Technology, Inc., San Jose, CA (US)

(72) Inventors: Matthew Aaron Silverman, Shaker Heights, OH (US); Ardalan Alizadeh, Milpitas, CA (US); Michael Barry DeLong, Macedonia, OH (US); Guru Prasanna Gopalakrishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 219 days.

(21) Appl. No.: 17/145,249

(22) Filed: Jan. 8, 2021

(65) Prior Publication Data

US 2022/0225317 A1    Jul. 14, 2022

(51) Int. Cl.
| | | |
|---|---|---|
| *H04W 72/04* | (2023.01) | |
| *H04W 72/51* | (2023.01) | |
| *G01S 3/26* | (2006.01) | |
| *H04W 72/044* | (2023.01) | |
| *H04W 84/12* | (2009.01) | |

(52) U.S. Cl.
CPC .............. *H04W 72/51* (2023.01); *G01S 3/26* (2013.01); *H04W 72/046* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,764,900 B1 | 9/2020 | Gopalakrishnan et al. | |
| 11,431,444 B2* | 8/2022 | Yeh | H04L 1/1896 |
| 2014/0327579 A1* | 11/2014 | Hart | G01S 3/38 342/442 |
| 2015/0078356 A1* | 3/2015 | Kwon | H04W 74/0816 370/338 |
| 2017/0201018 A1* | 7/2017 | Nikitin | H01Q 1/248 |
| 2018/0045805 A1* | 2/2018 | Hart | G01S 3/48 |
| 2018/0143284 A1 | 5/2018 | Wang et al. | |
| 2019/0137596 A1* | 5/2019 | Silverman | G01S 5/06 |
| 2019/0242970 A1* | 8/2019 | Silverman | G01S 5/06 |
| 2020/0219343 A1 | 7/2020 | Stitt et al. | |
| 2020/0275426 A1* | 8/2020 | Silverman | H04W 72/042 |

(Continued)

OTHER PUBLICATIONS

Tian, Z., et al., "Multi-target localization and tracking using TDOA and AOA measurements based on Gibbs-GLMB filtering"; Sensors, vol. 19, Dec. 2019.

(Continued)

*Primary Examiner* — Kodzovi Acolatse
(74) *Attorney, Agent, or Firm* — Merchant & Gould P.C.

(57) ABSTRACT

A method may be provided. One or more packets from a client may be received, in a block based modulation environment, at one or more switchable antennas of an access point. The access point may have a plurality of switchable antennas. Each switchable antenna may have an antenna state. The plurality of switchable antennas may be switched among such that at least five of the antenna states are sampled. Angle of arrival of the client may be calculated based on the at least five of the antenna states.

20 Claims, 10 Drawing Sheets

(56) References Cited

U.S. PATENT DOCUMENTS

2020/0355779 A1* 11/2020 Hart .................... G01S 3/48
2021/0281364 A1* 9/2021 Yeh ..................... H04L 1/20

OTHER PUBLICATIONS

Zhengwang Tian et al., Multi-Target Localization and Tracking Using TDOA and AOA Measurements Based on Gibbs-GLMB Filtering; mdpi.com, Dec. 10, 2019 (22 pages).

Sheng, W.X., et al., "Super-resolution DOA estimation in switch beam smart antenna," 2000 5th International Symposium on Antennas, Propagation, and EM Theory. ISAPE 2000 (IEEE Cat. No. 00EX417), Beijing, China, 2000, pp. 603-606, doi: 10.1109/ISAPE.2000.894859.

Badawy, A., et al., "A simple cross correlation switched beam system (XSBS) for angle of arrival estimation"; IEEE Access vol. 5, Feb. 14, 2017.

Xu Wenlong et al., "A subarray-synthesis based 2D DOA estimation method", Journal of Electronics, Kexue Chubanshe, Beijing, CN; vol. 23, No. 5, Sep. 1, 2006, (Sep. 1, 2006) pp. 645-649, XP035909I2.

International Search Report and Written Opinion issued in International Patent Application No. PCT/US2022/011318 dated May 9, 2022 (13 pages).

* cited by examiner

| Client | Antenna States Covered (Current Round) | Antenna States Covered (All Rounds) | Initial Receiver Antenna State 58 |
|---|---|---|---|
| #1 (56a) | 1, 2, 3, 4, 5 | 1~5 | 6 |
| #2 (56a) | 6, 7, 8, 9, 10 | 6~10 | 6 |
| #3 (56a) | 6, 7, 8, 9, 10 | 6~10 | 6 |
| #1 (56b) | 6, 7, 8, 9, 10 | 1~10 | 11 |
| #2 (56b) | 11, 12, 13, 14, 15 | 6~15 | 11 |
| #3 (56b) | 11, 12, 13, 14, 15 | 6~15 | 11 |
| #1 (56c) | 11, 12, 13, 14, 15 | 1~15 | 1 Removed |
| #2 (56c) | 1, 2, 3, 4, 5 | 1~15 | 1 Removed |
| #3 (56c) | 1, 2, 3, 4, 5 | 1~15 | 1 Removed |

FIG. 11

| Client | Antenna States Covered (Current Round) | Antenna States Covered (All Rounds) | Initial Receiver Antenna State /58 |
|---|---|---|---|
| 56a { #1 | 1, 2, 3, 4, 5 | 1 ~ 5 | 6 |
| #2 | 6, 7, 8, 9, 10 | 6 ~ 10 | 6 |
| #3 | 6, 7, 8, 9, 10 | 6 ~ 10 | 6 |
| #4, #5 Wake Up | | | |
| 56b { #1 | 6, 7, 8, 9, 10 | 1 ~ 10 | 11 |
| #2 | 11, 12, 13, 14, 15 | 6 ~ 15 | 11 |
| #3 | 11, 12, 13, 14, 15 | 6 ~ 15 | 11 |
| #4 | 11, 12, 13, 14, 15 | 11 ~ 15 | 11 |
| #5 | 11, 12, 13, 14, 15 | 11 ~ 15 | 11 |
| 56c { #1 | 11, 12, 13, 14, 15 | 1 ~ 15 | 1 |
| #2 | 1, 2, 3, 4, 5 | 1 ~ 15 | 1 |
| #3 | 1, 2, 3, 4, 5 | 1 ~ 15 | 1 |
| #4 | 1, 2, 3, 4, 5 | 1 ~ 5, 11 ~ 15 | 6 |
| #5 | 6, 7, 8, 9, 10 | 6 ~ 15 | 6 |
| 56d { #4 | 6, 7, 8, 9, 10 | 1 ~ 15 | 1 Removed |
| #5 | 1, 2, 3, 4, 5 | 1 ~ 15 | 1 Removed |

FIG. 12

NEED-BASED ANTENNA SWITCHING IN WI-FI ANGLE-OF-ARRIVAL LOCATIONING

TECHNICAL FIELD

The present disclosure relates generally to communication networks, and more particularly to wireless communications.

BACKGROUND

Wireless communication networks are widely deployed to provide various communication services such as voice, video, packet data, messaging, broadcast, etc. These wireless networks may be multiple-access networks capable of supporting multiple users by sharing the available network resources.

The demand for location based services continues to increase. There are many techniques for determining the position of a device using radio signals. Technologies such as Global Positioning Systems (GPS) are often used in outdoor environments. Indoor location sensing presents different problems than outdoor positioning. Conventional techniques have difficulty accurately calculating indoor locations in high ceiling areas or multi-story areas comprising open atriums, stairways, or escalators.

BRIEF DESCRIPTION OF THE FIGURES

The accompanying drawings, which are incorporated in and constitute a part of this disclosure, illustrate various implementations of the present disclosure. In the drawings:

FIG. 11 is a diagram illustrating another example antenna switching stage 404 of FIG. 4 in accordance with aspects of the present disclosure;

FIG. 12 is a diagram illustrating another example antenna switching stage 404 of FIG. 4 in accordance with aspects of the present disclosure.

DETAILED DESCRIPTION

Overview

Figure 1:
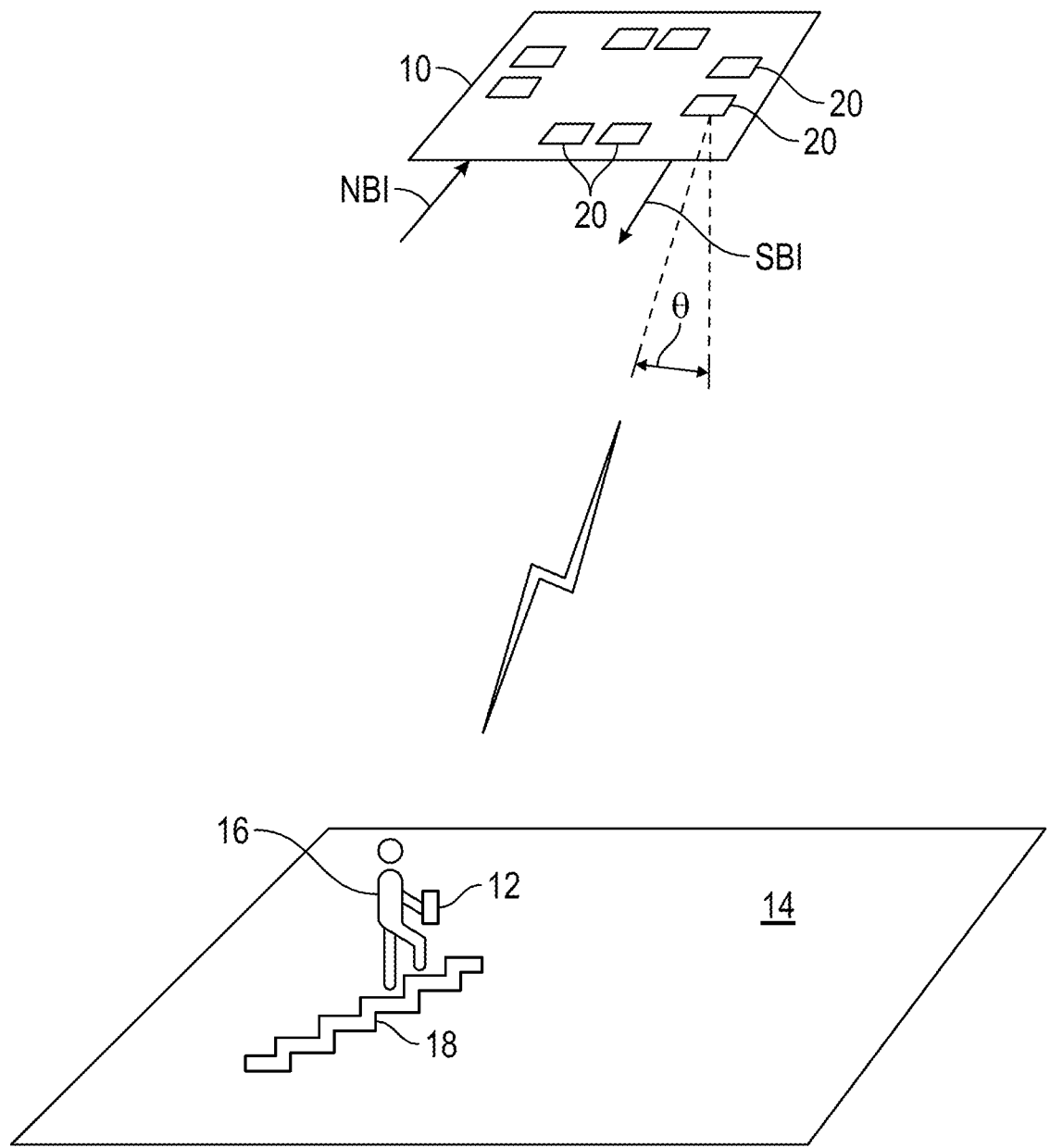
FIG. 1 is a diagram illustrating an example environment in which implementations described herein may be implemented in accordance with aspects of the present disclosure.

A method may be provided. One or more packets from a client may be received, in a block based modulation environment, at one or more switchable antennas of an AP. The AP may have a plurality of switchable antennas. Each switchable antenna may have an antenna state. The plurality of switchable antennas may be switched among such that at least five of the antenna states are sampled. AoA of the client may be calculated based on the at least five of the antenna states.

Both the foregoing overview and the following example implementation are examples and explanatory only, and should not be considered to restrict the disclosure's scope, as described and claimed. Furthermore, features and/or variations may be provided in addition to those described. For example, implementations of the disclosure may be directed to various feature combinations and sub-combinations described in the example implementation.

Example Implementations

The following detailed description refers to the accompanying drawings. Wherever possible, the same reference numbers are used in the drawings and the following description to refer to the same or similar elements. While implementations of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

AoA is used in indoor applications. These indoor environments can include high ceiling deployments using Wi-Fi hotspots located in the ceiling of a building or facing horizontally across an open atrium, for example. AoA may be calculated by either infrastructure (e.g., access point) or client. The former is called infrastructure calculated AoA, whereas the latter is called client calculated AoA. Location sensing can be performed on any Wi-Fi type packet.

FIG. 1 is a diagram illustrating an example environment in which examples described herein may be implemented. FIG. 1 illustrates an AP 10 in communication with a client (also known as a mobile device, used interchangeably herein) 12 located at a position in a building (e.g., shopping center, retail store, warehouse, convention center, conference center, sports arena, stadium, and the like). The building may include any number of floors, stairways, escalators, open atriums, etc. In the example shown in FIG. 1, client 12 is carried by a user 16 located on a stairway 18 in the building. For simplification, only one floor 14 is shown. The example of FIG. 1 shows only one client 12, however, AP 10 may be in communication with any number of clients 12. Also, there may be more than one AP 10.

AP 10 may include any number of antennas 20 (also referred to as antenna elements or antenna array). As described below, AP 10 includes a transmitter and receiver (or collectively referred to as "transceiver"). The receiver at AP 10 may be used to identify a location of client 12 based on signals received from client 12. The transmitter at AP 10 may be used to transmit signals to client 12 to enable client 12 to identify its location. AP 10 may also be in communication with a wired network (not shown). AP 10 may be used to provide wireless Internet access to client 12 via a WLAN (wireless local area network), for example.

Client 12 may be any suitable equipment that supports wireless communication, including for example, a mobile phone, wireless VoIP phone, Personal Digital Assistant (PDA), laptop computer, tablet, multimedia device, or any other device capable of operating in a wireless environment. Client 12 may have one or more antennas.

AP 10 may be a MIMO (multiple-input multiple-output) device. In one implementation, AP 10 is configured to simultaneously transmit from its antennas 20 multiple signal streams, also referred to as spatial streams, to client 12. In one implementation, AP 10 may be configured for block based modulation (e.g., OFDM (Orthogonal Frequency Division Multiplexing), OFDMA (Orthogonal Frequency Division Multiplexing Access)) or other multicarrier modulation method. The term 'block based modulation' as used herein refers to operations performed in a Wi-Fi type environment (i.e., not Bluetooth technologies). AP 10 and client 12 may be configured to perform wireless communication according to a wireless network communication protocol such as IEEE 802.11/Wi-Fi, IEEE 802.16/WiMAX, or other suitable protocol.

In the aspects described herein, transmissions from client 12 to AP 10 are referred to as uplink transmissions (received at northbound interface (NBI) at AP 10) and transmissions from AP 10 to client 12 are referred to as downlink transmissions (transmitted from southbound interface (SBI) at AP 10). In some implementations, the northbound interface may be used for infrastructure (AP) calculated location using angle of arrival. In other implementations, the southbound interface may be used for client calculated location using angle of arrival.

AoA is used at AP 10 to locate client 12 by determining the angle of incidence at which signals arrive at antennas 20. Client 12 transmits a payload with metadata (e.g., client identity) followed by a waveform. Using the signal that is received at the multiple antenna array, AoA of client 12 at AP 10 can be estimated from the properties of the wireless channel. Receiving the signal at an antenna may be included in receiving the antenna state. Sampling an antenna (or interchangeably "sampling an antenna state") can include receiving the signal at the antenna for AoA calculation. Geometric relationships can be used to estimate location from the intersection of two lines of bearing formed by a radial line to each antenna 20. For instance, AoA may be defined as an angle between the propagation direction of an incident wave and some reference direction (e.g., angle θ in FIG. 1). As described below, electronic switching can be performed among antennas 20 by an antenna switch, and mathematical computations may be handled by a background computing system (e.g., a processing unit) used to extract the angles of incidence.

In one implementation, Time Difference of Arrival (TDoA), which uses relative time measurements at each antenna 20, is calculated between elements of the array by measuring the difference in received phase at each antenna 20. AoA determines the direction by measuring the TDoA at individual antenna 20 of the array. These delays are used to calculate the AoA. The TDoA measurement may be made by measuring the difference in received phase at each antenna 20. For example, the nearer antenna 20 receives the signal earlier and the farther antenna 20 receives the signal later. Time translates to distance via the speed of light, and the distance modulo the wavelength is measurable as carrier phase.

In one example at the northbound interface, AP 10 switches through a portion of all antennas 20 and gets a vector of phases (one per antenna 20). Depending on the horizontal (xy) location of client 12 under AP 10, the vector of phases changes. This may be referred to as a feature vector (also referred to as a signature or fingerprint). If antennas 20 are sufficiently closely spaced, the feature vector is similar to feature vectors at immediately adjacent horizontal locations but very different from feature vectors further away.

It should be noted that the environment shown in FIG. 1 and described above is only an example and that the implementations described herein may be implemented in environments having different configurations, network devices, or network topologies. For example, as previously noted, AP 10 may be in communication with any number of clients 12 and more than one AP 10 may be used. Also, AP 10 and antennas 20 may be different than described herein, without departing from the scope of the embodiments. Moreover, a host may be in communication with AP 10 and any number of clients.

Figure 2:
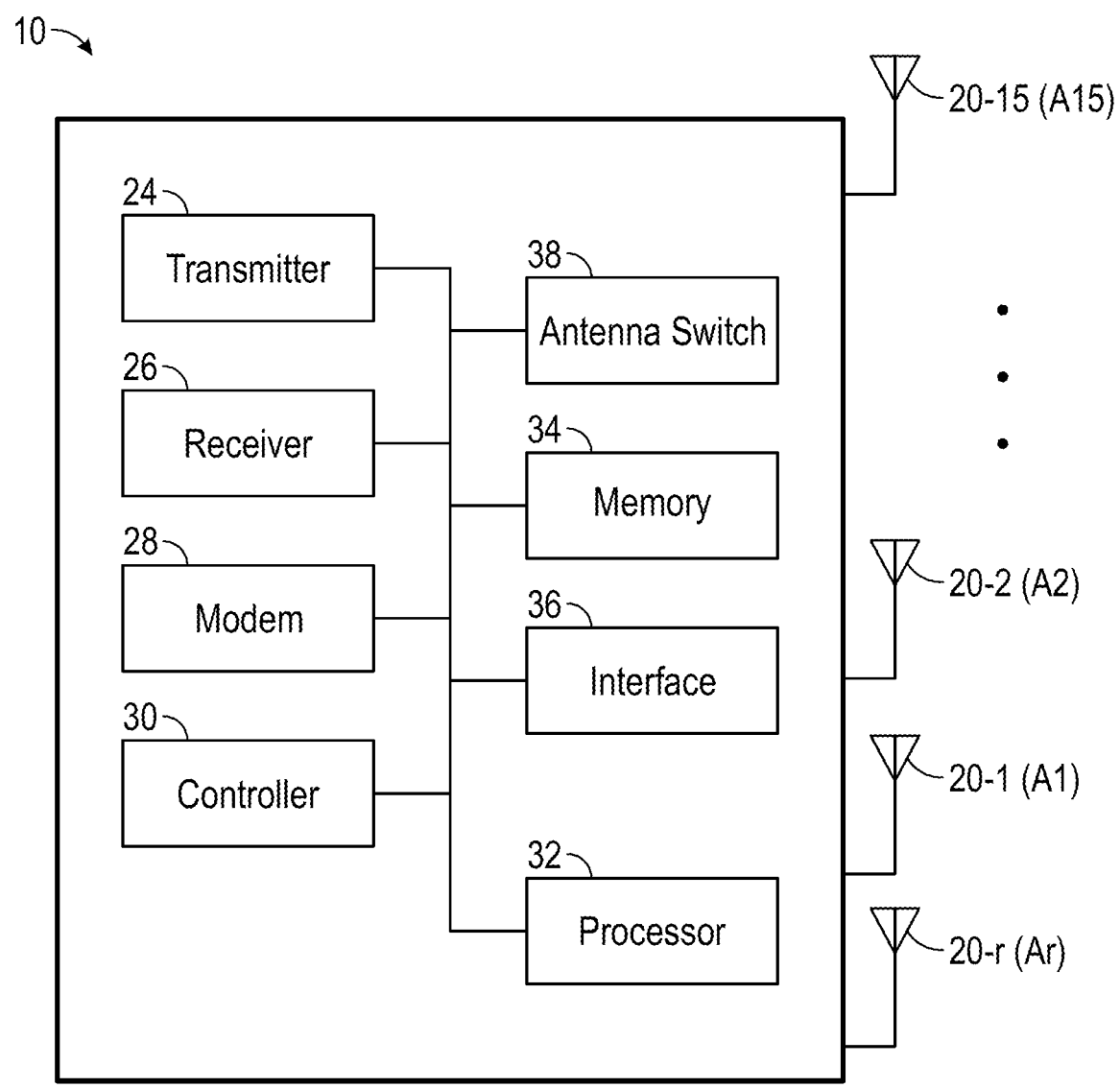
FIG. 2 is a block diagram illustrating an example Access Point (AP) that may be used to implement implementations described herein in accordance with aspects of the present disclosure.

FIG. 2 is a block diagram illustrating an example AP 10 that may be used to implement embodiments described herein. In one implementation, AP 10 is a programmable machine that may be implemented in hardware, software, or any combination thereof. AP 10 includes, among other things, a transmitter 24, a receiver 26, a modem 28, a controller 30, a processor 32, a memory 34, an interface 36, and an antenna switch 38. The terms transmitter 24 and receiver 26 as used herein may also be referred to as a transceiver.

Modem 28 is configured to implement modulation and framing of signals according to the applicable communication protocol or standard (e.g., IEEE 802.11) under control of controller 30. Modem 28 receives as input, the output of receiver 26. Analog-to-digital converters (ADCs) may reside between the output of receiver 26 and modem 28, within modem 28, or within receiver 26. Modem 28 demodulates signals from receiver 26 and modulates transmit signals for transmission. The output of modem 28 is coupled to transmitter 24. Digital to analog converters (DACs) may be provided between the digital output of modem 28 and the analog input of transmitter 24.

Controller 30 includes logic to implement embodiments described herein. The logic may be encoded in one or more tangible media (e.g., memory 34) for execution by processor 32. For example, processor 32 may execute codes stored in a computer-readable medium such as memory 34. The logic may be in the form of software executed by processor 32, digital signal processor instructions, or in the form of fixed logic in an integrated circuit, for example. In some implementations, controller 30 and processor 32 may be collectively referred to as the processing unit.

Memory 34 may be a volatile memory or non-volatile storage, which stores various applications, operating systems, modules, and data for execution and use by processor 32. Memory 34 may include multiple memory components. Interface 36 may include any number of wireless or wired interfaces. For example, AP 10 may include a network interface for communication with a LAN.

Transmitter 24 is coupled to a plurality of antennas 20 through antenna switch 38. In the example shown in FIG. 2, AP 10 includes sixteen antennas 20-$r$, 20-1, 20-2, . . . , 20-15

(collectively 20). Antenna 20-r (also referred to as Ar) is a reference antenna, and the connection of one radio frequency (RF) chain to antenna Ar is always fixed. Antennas 20-1 (also referred to as A1), 20-2 (also referred to as A2), . . . , 20-15 (also referred to as A15) are switchable antennas, and the connection of another RF chain to one of antennas A1, A2, . . . , A15 is switched by antenna switch 38, which is controllable via vector signal processing architecture (VSPA). It should be noted that other number (seven, thirty-one, etc.) of switchable antennas are within the scope of the disclosure.

It should be noted that AP 10 shown in FIG. 2 and described above is only an example and that different configurations of AP 10 may be used. For example, AP 10 may further include any suitable combination of hardware, software, algorithms, processors, devices, components, or elements operable to facilitate the capabilities described herein. One or more components shown in the block diagram of FIG. 2 may be implemented on a chip or chipset.

Figure 3:
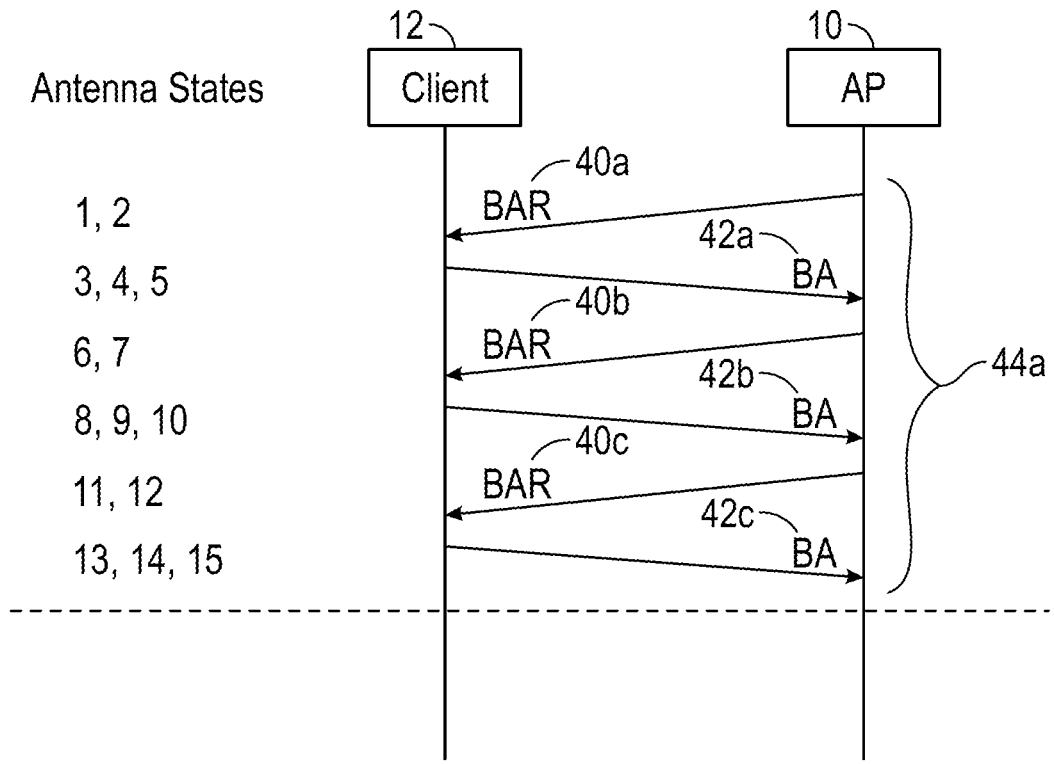
FIG. 3 is a diagram illustrating a prior art antenna switching in accordance with aspects of the present disclosure.

FIG. 3 is a diagram illustrating antenna switching. In the example shown in FIG. 3, AP 10 has one reference antenna Ar and fifteen switchable antennas A1, A2, . . . , A15, as described above. Switchable antennas A1, A2, . . . , A15 are switched in a linear/circular manner. For example, at time T1, a new phase angle is calculated between reference antenna Ar and antenna A1; at subsequent time T2, another new phase angle is calculated between reference antenna Ar and antenna A2. This process continues until a new phase angle is calculated between reference antenna Ar and antenna A15. Then antenna switch 38 switches back to antenna A1. In one implementation, antenna switch 38 may switch antennas A1, A2, . . . , A15 every two OFDMA symbols. Accordingly, receiver 26 may collect three antenna states over a six-symbol Physical Layer Convergence Protocol (PLCP) Protocol Data Unit (PPDU).

It is desirable to sample all of the antennas (i.e., antennas A1, A2, . . . , A15) in the antenna array for AoA calculation. In one implementation, at least five of all of the antenna states are sampled. Receiver 26 does not know from which client it is currently receiving packets while it is doing the antenna switch control. There are certain traffic patterns/scenarios where receiver 26 may never sample certain antennas for a particular client. One example is the Block Acknowledgement Request (BAR) and Block Acknowledgement (BA) exchange. BA is an 802.11 MAC feature that increases throughput by decreasing protocol overhead. Instead of individually acknowledging each received packet, a single BA frame can acknowledge multiple packets. This reduces the number of acknowledge (Ack) frames and corresponding interframe spaces, thereby increasing throughput. In one implementation, a single BAR frame corresponds to four symbols, therefore corresponding to two antenna states; a single BA frame corresponds to six symbols, therefore corresponding to three antenna states.

As shown in the example in FIG. 3, AP sends BAR 40a to client 12, and BAR 40a is captured over antenna A1 and A2. In other words, BAR 40a corresponds to antenna states 1 (corresponding to antenna A1) and 2 (corresponding to antenna A2). In response, client 12 sends BA 42a to AP 10. BA 42a corresponds to antenna states 3 (corresponding to antenna A3), 4 (corresponding to antenna A4), and 5 (corresponding to antenna A5). Subsequently, AP 10 sends BAR 40b to client 12. BAR 40b corresponds to antenna states 6 (corresponding to antenna A6) and 7 (corresponding to antenna A7). In response, client 12 sends BA 42b to AP 10. BA 42b corresponds to antenna states 8 (corresponding to antenna A8), 9 (corresponding to antenna A9), and 10 (corresponding to antenna A10). AP 10 then sends BAR 40c to client 12. BAR 40c corresponds to antenna states 11 (corresponding to antenna A11) and 12 (corresponding to antenna A12). In response, client 12 sends BA 42c to AP 10. BA 42c corresponds to antenna states 13 (corresponding to antenna A13), 14 (corresponding to antenna A14), and 15 (corresponding to antenna A15). As such, a first cycle 44a of antenna switching (i.e., a first antenna switching cycle 44a) is done. However, antenna states 1, 2, 6, 7, 11, and 12 are missing for AoA calculation. Even if the process continues, it starts repeating. Antenna states 1, 2, 6, 7, 11, and 12 will never be used for AoA calculation in this example.

Figure 4:
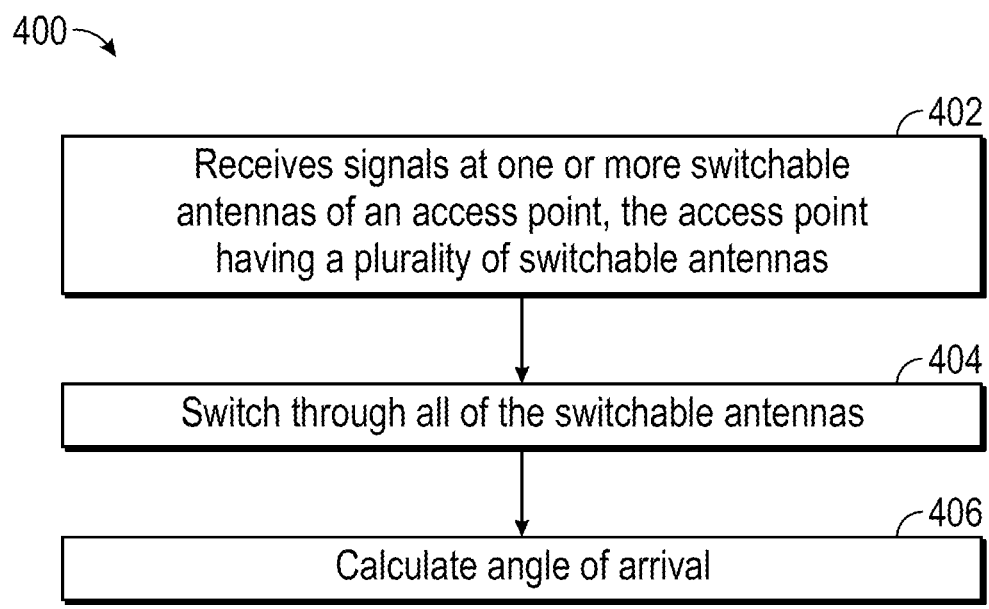
FIG. 4 is flow chart illustrating a method for location sensing using an AP calculated Angle of Arrival (AoA) in accordance with aspects of the present disclosure.

FIG. 4 is flow chart illustrating a method 400 for location sensing using AP calculated AoA in accordance with some implementations. In method 400, the switchable antennas (e.g., antennas A1-A15 in the example of FIG. 2), of an AP (e.g., AP 10 in the example FIG. 2), are sampled for AoA calculation. In one implementation, at least five of all of the antenna states are sampled. In still other implementations, all of the antenna states are sampled. Specifically, at stage 402, AP 10 receives, from client 12, one or more signals at one or more switchable antennas of AP 10. As mentioned above, AP 10 includes multiple switchable antennas (e.g., fifteen switchable antennas A1-A15 in the example of FIG. 2). As previously described, AP 10 includes receiver 26 in communication with antennas A1-A15 for receiving one or more packets (e.g., PPDUs) in a block based modulation environment (e.g., OFDM or other modulation method for use in a system configured for Wi-Fi type communication).

At stage 404, AP 10 switches through the switchable antennas A1-A15. In one implementation, at least five of all of the antenna states are sampled. In other implementations, all of the antenna states are sampled. Specifically, AP 10 includes controller 30 and antenna switch 38, and antenna switch 38, under the control of controller 30, switches through all of the switchable antennas A1-A15. There are multiple approaches to switch through all of the switchable antennas A1-A15, which will be described in detail with reference to FIGS. 5-12.

At stage 406, the AoA is calculated. In one implementation, AP 10 includes processor 32, and processor 32 calculates AoA for use in identifying a location of client 12 that transmits packets. In one implementation, communications and location sensing may be accomplished with the same packets so that positioning can occur in parallel with Wi-Fi communications, thereby taking advantage of the multiple-input and multiple-output (MIMO) abilities of AP 10. Signals may be processed using a frequency domain or time domain technique, to identify a location of client 12 based on AoA calculations.

Figure 5:
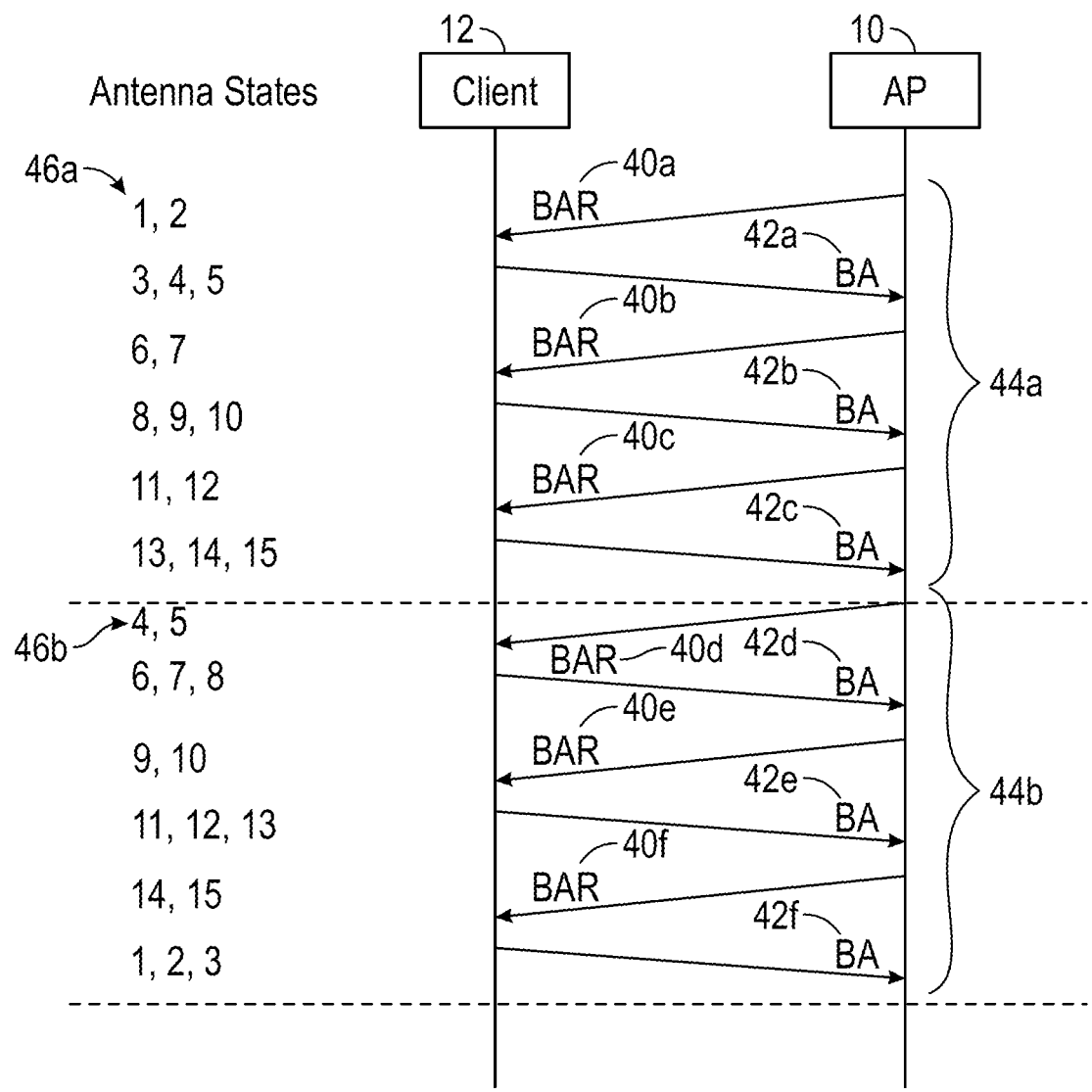
FIG. 5 is a diagram illustrating an example antenna switching stage 404 of FIG. 4 in accordance with aspects of the present disclosure.

FIG. 5 is a diagram illustrating an example antenna switching stage 404 of FIG. 4 in accordance with some implementations. In general, AP 10 (specifically antenna switch 38 of AP 10, under control of controller 30) randomizes the starting antenna state of receiver 26 for each cycle of antenna switching, such that all of the switchable antennas A1-A15 are switched through. In the example shown in FIG. 5, in the first cycle 44a of antenna switching, antenna states 1, 2, 6, 7, 11, and 12 are missing for the AoA calculation. The details of the first cycle 44a of antenna switching is the same as that in FIG. 3, therefore not repeated here for simplicity. The starting antenna state 46a is antenna state 1.

In the second cycle 44b of antenna switching, the starting antenna state 46b is randomized. In the example of FIG. 5, starting antenna state 46b is antenna state 4. As a result, AP sends BAR 40d to client 12 at the beginning of the second cycle 44*b* of antenna switching, and BAR 40*a* is captured over antenna A4 and A5. In other words, BAR 40*d* corresponds to antenna states 4 and 5. In response, client 12 sends BA 42*d* to AP 10. BA 42*d* corresponds to antenna states 6, 7, and 8. Subsequently, AP 10 sends BAR 40*e* to client 12. BAR 40*e* corresponds to antenna states 9 and 10. In response, client 12 sends BA 42*e* to AP 10. BA 42*e* corresponds to antenna states 11, 12, and 13. AP 10 then sends BAR 40*f* to client 12. BAR 40*f* corresponds to antenna states 14 and 15. In response, client 12 sends BA 42*f* to AP 10. BA 42*f* corresponds to antenna states 1, 2, and 3. As such, second cycle 44*b* of antenna switching is done. Antenna states 1, 2, 6, 7, 11, and 12, which are missing for AoA calculation in first cycle 44*a*, are all sampled in second cycle 44*b*. Accordingly, all of the antenna states 1-15 are sampled. In other words, all of the switchable antennas A1-A15 are switched through. As shown in the example of FIG. 5, randomizing the starting antenna state 44 (44*a* and 44*b* collectively referred to as 44) can ensure that all of the antenna states 1-15 are sampled, but it may increase the number of expected antenna states that it will take to sample all antenna states, as some antenna states (e.g., antenna states 3, 8, and 13) are sampled more than once.

Figure 6:
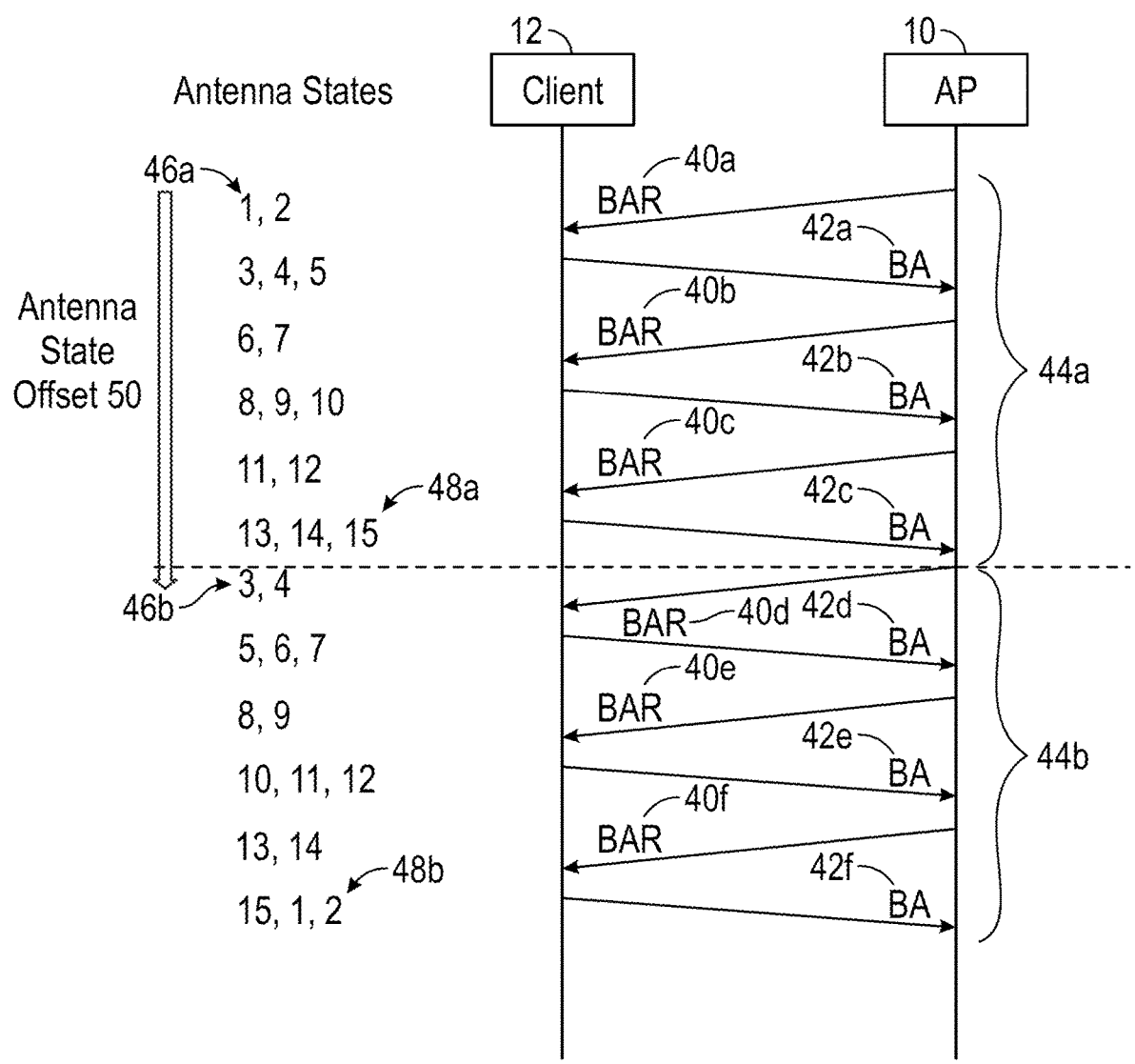
FIG. 6 is a diagram illustrating another example antenna switching stage 404 of FIG. 4 in accordance with aspects of the present disclosure.

FIG. 6 is a diagram illustrating another example antenna switching stage 404 of FIG. 4 in accordance with some implementations. In general, AP 10 (specifically antenna switch 38 of AP 10, under control of controller 30) chooses starting antenna state of receiver 26 for each cycle of antenna switching depending on ending antenna state of receiver 26 for that cycle, such that all of switchable antennas A1-A15 are switched through. In the example shown in FIG. 6, in the first cycle 44*a* of antenna switching, antenna states 1, 2, 6, 7, 11, and 12 are missing for AoA calculation. The details of the first cycle 44*a* of antenna switching is the same as that in FIG. 3, therefore not repeated here for simplicity. The starting antenna state 46*a* is antenna state 1, whereas the ending antenna state 48*a* is antenna state 15. Starting antenna state 46*a* (i.e., antenna state 1) is the next antenna state of ending antenna state 48*a* (i.e., antenna state 15). As a result, AP 10 (specifically antenna switch 38 of AP 10, under control of controller 30) chooses the next starting antenna state of receiver 26 for the next cycle 44*b* of antenna switching based on an antenna state offset 50. In the example of FIG. 6, antenna state offset 50 is equal to two. In other words, the starting antenna state 46*b* for second cycle 44*b* of antenna switching is antenna state 3 (i.e., 1+2=3).

Therefore, at the beginning of second cycle 44*b* of antenna switching, AP sends BAR 40*d* to client 12, and BAR 40*a* is captured over antenna A3 and A4. In other words, BAR 40*d* corresponds to antenna states 3 and 4. In response, client 12 sends BA 42*d* to AP 10. BA 42*d* corresponds to antenna states 5, 6, and 7. Subsequently, AP 10 sends BAR 40*e* to client 12. BAR 40*e* corresponds to antenna states 8 and 9. In response, client 12 sends BA 42*e* to AP 10. BA 42*e* corresponds to antenna states 10, 11, and 12. AP 10 then sends BAR 40*f* to client 12. BAR 40*f* corresponds to antenna states 13 and 14. In response, client 12 sends BA 42*f* to AP 10. BA 42*f* corresponds to antenna states 15, 1, and 2. As such, second cycle 44*b* of antenna switching is done. Antenna states 1, 2, 6, 7, 11, and 12, which are missing for AoA calculation in first cycle 44*a*, are all sampled in second cycle 44*b*. Accordingly, all of the antenna states 1-15 are sampled. In other words, all of the switchable antennas A1-A15 are switched through. As shown in the example of FIG. 5, offsetting the starting antenna state 44*b* when necessary can ensure that all of the antenna states 1-15 are sampled, but it may increase the number of expected antenna states that it will take to sample all antenna states, as some antenna states (e.g., antenna states 5, 10, and 15) are sampled more than once.

Figure 7:
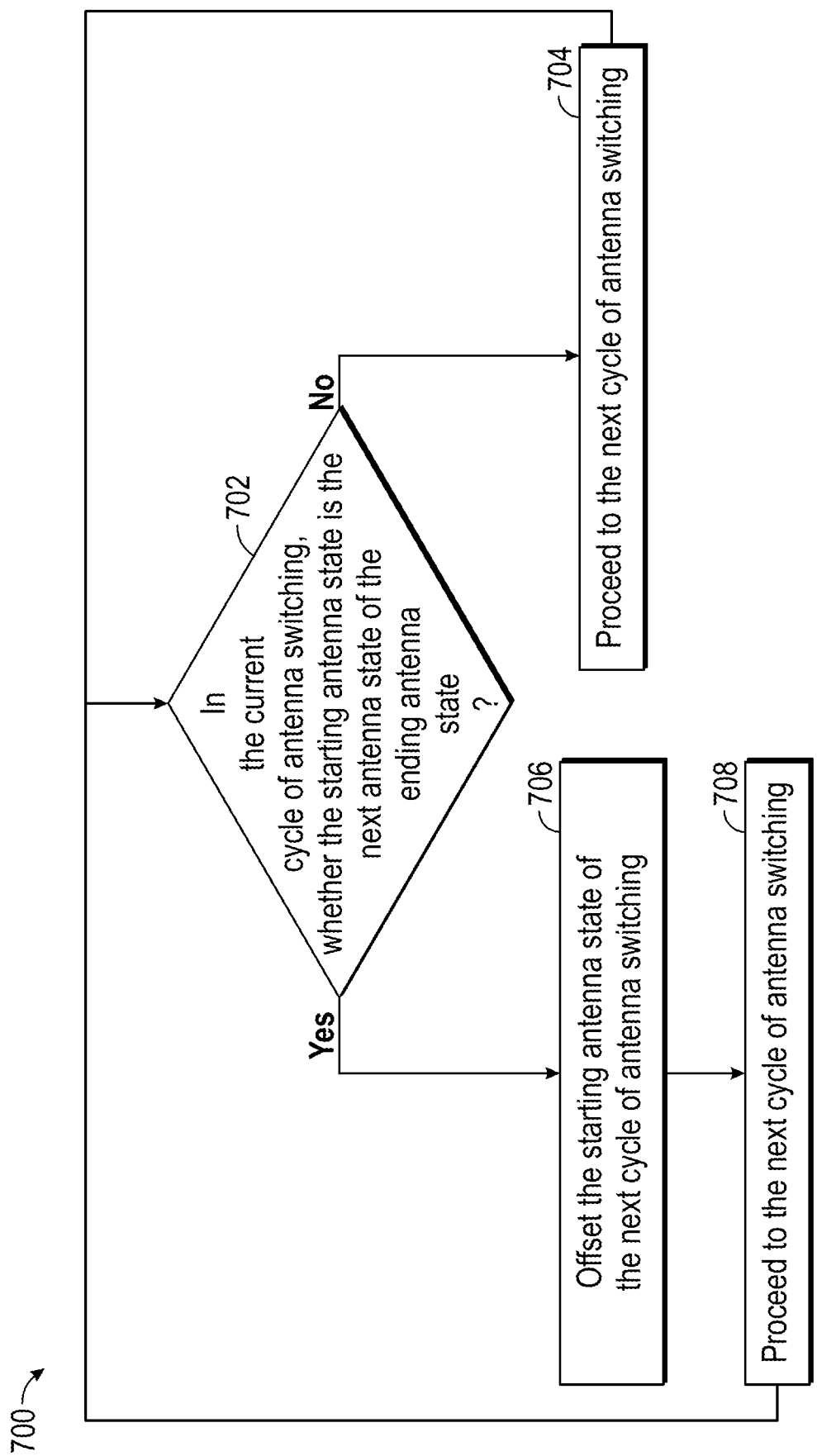
FIG. 7 is a flow chart illustrating an example process for antenna switching in accordance with aspects of the present disclosure.

It should be noted that the antenna switching stage of FIG. 6 is only one example. FIG. 7 is a flow chart illustrating an example process 700 for antenna switching in accordance with some implementations. At stage 702, it is determined whether the staring antenna state (e.g., antenna state X) of the current cycle of antenna switching is the next antenna state of the ending antenna state (e.g., antenna state (X−1)) of the current cycle of antenna switching. When the starting antenna state is not the next antenna state of the ending antenna state, the process 700 proceeds to the next cycle of antenna switching at stage 704. When the starting antenna state is the next antenna state of the ending antenna state as shown in the example of FIG. 6, the process 700 proceeds to stage 706, where the starting antenna state of the next cycle of antenna switching is offset, by an antenna state offset 50 (e.g., two antenna states as shown in the example of FIG. 6). Then, the process 700 proceeds to the next cycle of antenna switching at stage 708. After either stage 704 or stage 708, the process 700 circles back to stage 702 and repeats itself, until all of the switchable antennas are switched through. It should be noted that antenna state offset 50 may be set as numbers other than two.

Figure 8:
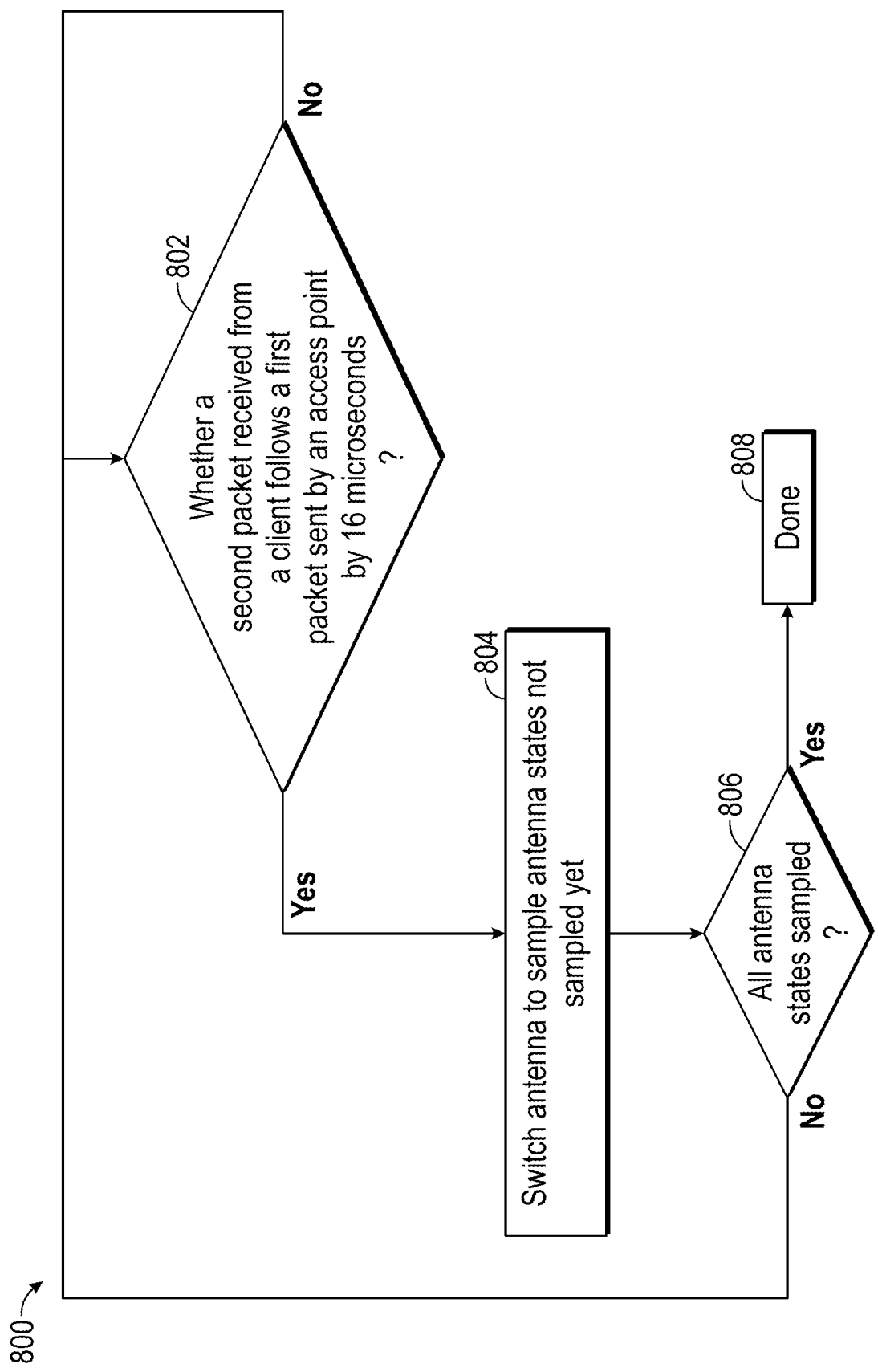
FIG. 8 is a diagram illustrating another example process for antenna switching in accordance with aspects of the present disclosure.
Figure 9:
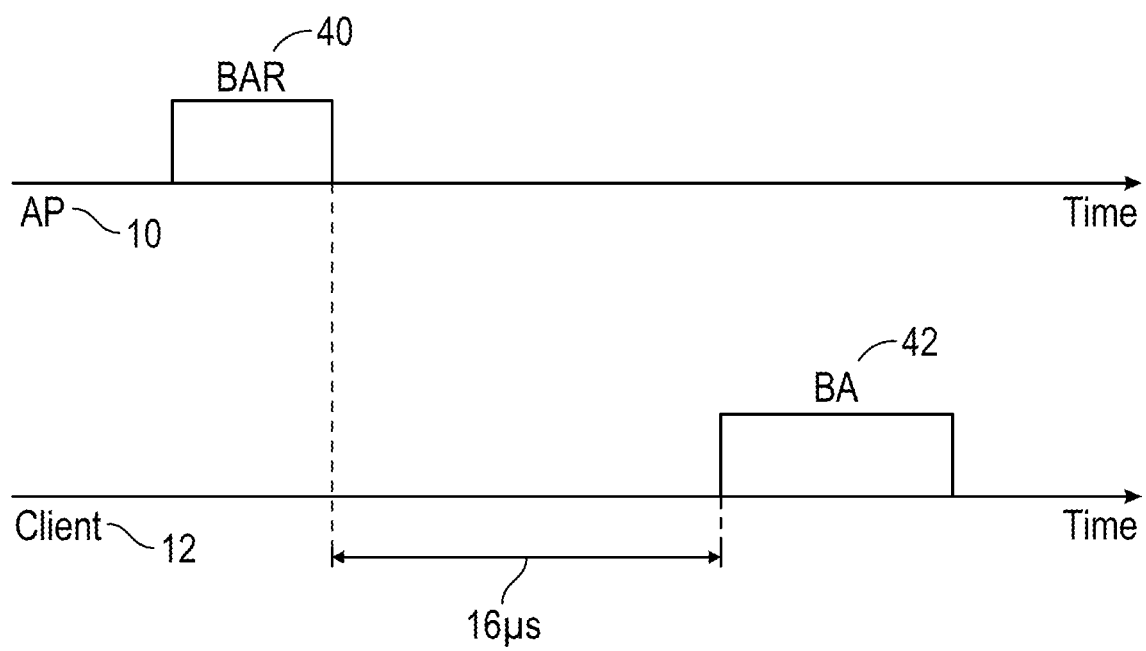
FIG. 9 is a diagram illustrating an example packet exchange corresponding to the example process of FIG. 8 in accordance with aspects of the present disclosure.

FIG. 8 is a diagram illustrating another example process 800 for antenna switching in accordance with some implementations. FIG. 9 is a diagram illustrating an example packet exchange corresponding to the example process 800 of FIG. 8. In general, AP 10 determines whether a second packet received from client 12 follows a first packet sent by AP 10 by a predetermined period, and switches antennas to sample antennas states not sampled yet only when the second packet follows the first packet by the predetermined period.

In the example shown in FIG. 9, the first packet is BAR 40 sent by AP 10, and the second packet is BA 42 sent by client 12 in response to BAR 40. The predetermined period is 16 μs in the example shown in FIG. 9. In other words, the beginning of BA 42 follows the ending of BAR 40 by 16 μs. Once AP 10 knows that BA 42 follows BAR 40 by 16 μs, it may confirm that the packet it receives is actually BA 42.

Referring back to FIG. 8, at stage 802, AP 10 determines whether the second packet received from client 12 follows the first packet sent by AP 10 by the predetermined period (e.g., 16 μs in this example). When the second packet receive from client 12 does not follow the first packet sent by AP 10 by the predetermined period (indicating that the packet received is not BA 42), AP 10 does not conduct any antenna switching and the process 800 loops back to stage 802. When the second packet receive from client 12 follows the first packet sent by AP 10 by the predetermined period, AP 10 conducts antenna switching to sample antenna states not sampled yet, at stage 804. AP 10 may keep an internal record of the antenna states that have not been sampled yet and change the internal record accordingly after the antenna switching. In one implementation, AP 10 may include an internal counter to keep the internal record. Then at stage 806, AP 10 may determine whether all antenna states are sampled. AP 10 may determine whether all antenna states are sampled based on the internal record. When all antenna states are sampled, process 800 is done at stage 808. When at least one antenna state has not been sampled yet, process 800 loops back to stage 802. As such, AP 10 may eventually make sure that all antenna states are sampled for AoA calculation.

Figure 10:
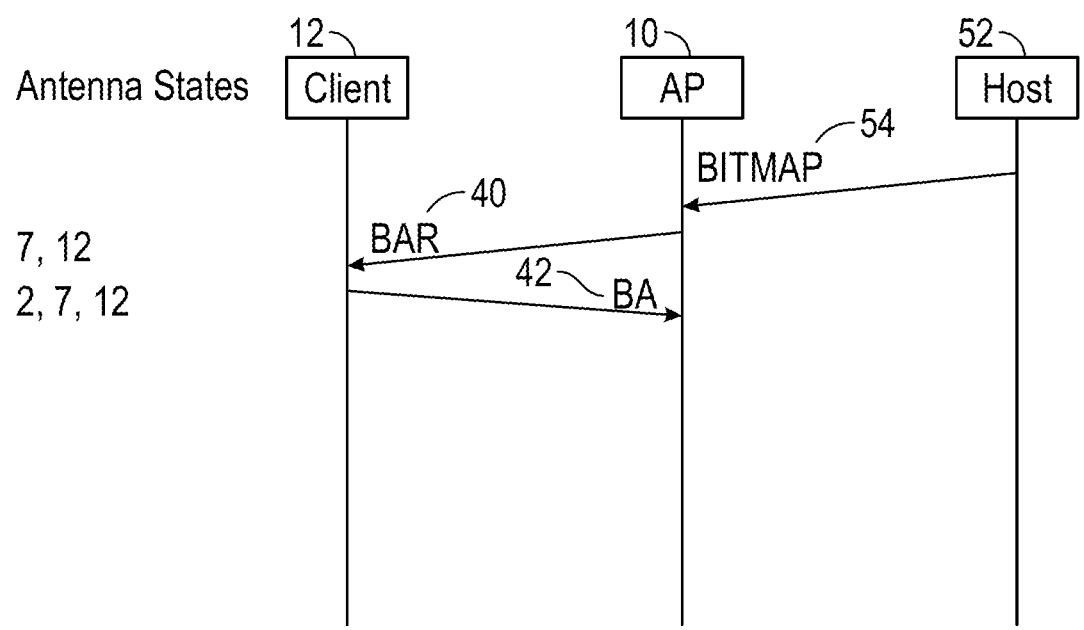
FIG. 10 is a diagram illustrating another example antenna switching stage 404 of FIG. 4 in accordance with aspects of the present disclosure.

FIG. 10 is a diagram illustrating another example antenna switching stage 404 of FIG. 4 in accordance with some implementations. In general, AP 10 coordinates with host 52 to make sure that all antenna states are sampled for AoA calculation.

As shown in the example in FIG. 10, host 52 may keep bitmap 54 that indicates what packets have been received during current dwell for the most recent heard client MAC address on a tracking list. For client 12, bitmap 54 indicates what packets have been received for client 12. Bursts of BAR/BA may be done on a client-by-client basis. Once a new client is heard, the bitmap 54 is reset.

AP 10 may poll bitmap 54 that is kept at host 52. In one implementation, AP 10 may poll bitmap 54 every time all antenna states have been sampled. In another implementation, host 52 may push command to AP 10 with bitmap 54. Once AP 10 obtains bitmap 54, it may know antenna states that have not been sampled yet for client 12. As a result, AP 10 (specifically antenna switch 37 of AP 10, under control of controller 30) may trim its sequence of antennas to only include the antennas corresponding to antenna states that have not been sampled yet. In the example shown in FIG. 10, antenna states 2, 7, and 12 have not been sampled yet for client 12. Once AP 10 knows that, AP 10 may send BAR 40 to client 12, and BAR 40 corresponds to antenna states 7 and 12. In response, client 12 may send BA 42 to AP 10, and BA 42 corresponds to antenna states 2, 7, and 12. After receiving BA 42, AP 10 has sampled all antenna sates 1-15, and AoA can be calculated based on all antenna states 1-15. The process continues with a full sequence of antennas (e.g., antennas A1-A15) again.

FIG. 11 is a diagram illustrating another example antenna switching stage 404 of FIG. 4 in accordance with some implementations. FIG. 12 is a diagram illustrating yet another example antenna switching stage 404 of FIG. 4 in accordance with some implementations. In general, bursts of BAR/BA are interleaved between multiple clients in the examples of FIG. 11 and FIG. 12. In the example of FIG. 11, bursts of BAR/BA are interleaved among three clients (Client #1, Client #2, and Client #3). In the example of FIG. 12, bursts of BAR/BA are interleaved among three clients (Client #1, Client #2, and Client #3) earlier and among five clients (Client #1, Client #2, Client #3, Client #4, and Client #5) later after two clients (Client #4 and Client #5) wake up.

Referring to FIG. 11, there are three clients (Client #1, Client #2, and Client #3) awake. Assume there are fifteen antenna states 1-15 as shown above. A first BAR is sent to Client #1, and a second BAR is sent to Client #2 and so on. As a result, in a first round 56a, antenna states 1-5 are covered for Client #1. Then, initial receiver antenna state 58 is set as the next antenna state for Client #1, which is antenna state 6 at this juncture. The next antenna state for any client (e.g., Client #1) is known by AP 10 because host 52 may keep bitmap 54 that indicates what packets have been received for that client, as shown in FIG. 10.

As a result of initial receiver antenna state 58 being antenna state 6, in a first round 56a, antenna states 6-10 are covered for Client #2 and Client #3. The initial receiver antenna state 58 is unchanged (i.e., still being antenna state 6).

Subsequently in a second round 56b, antenna states 6-10 are covered for Client #1 because antenna state 6 is the next antenna state for Client #1 after the first round 56a. Then, initial receiver antenna state 58 is set as the next antenna state for Client #1, which is antenna state 11 at this juncture. As a result, in the second round 56b, antenna states 11-15 are covered for Client #2 and Client #3. Initial receiver antenna state 58 is unchanged (i.e., still being antenna state 11).

Subsequently in a third round 56c, antenna states 11-15 are covered for Client #1 because antenna state 11 is the next antenna state for Client #1 after the second round 56b. Then, Client #1 is removed from the idle client list, and only Client #2 and Client #3 remain on the idle client list. Initial receiver antenna state 58 is set as the next antenna state for Client #2, which is antenna state 1 at this juncture. As a result, in the third round 56c, antenna states 1-5 are covered for Client #2. Then, Client #2 is removed from the idle client list, and only Client #3 remains on the idle client list. Initial receiver antenna state 58 is set as the next antenna state for Client #3, which is antenna state 1 at this juncture. As a result, in the third round 56c, antenna states 1-5 are covered for Client #3. Client #3 is removed from the idle client list. Because Client #3 is the last client in the idle client list, there is no need to set initial receiver antenna state 58. As such, Client #1, Client #2, and Client #3 have all been sounded (i.e., all antenna states 1-15 have been sampled), and the process ends.

Referring to FIG. 12, there are three clients (Client #1, Client #2, and Client #3) awake at the beginning and two clients (Client #4 and Client #5) wake up later. Again, assume there are fifteen antenna states 1-15 as shown above. A first BAR is sent to Client #1, and a second BAR is sent to Client #2 and so on. The whole process of FIG. 12 that is related to Client #1, Client #2, and Client #3 is similar to that of FIG. 11. and is not repeated for simplicity.

After the first round 56a, Client #4 and Client #5 wake up. In one implementation, AP 10 knows that based on bitmap 54 that is kept by host 52. As a result, Client #4 and Client #5 are added to the idle client list. Because initial receiver antenna state 58 is antenna state 11 at this juncture, antenna states 11-15 are covered for Client #4 and Client #5. Initial receiver antenna state 58 is unchanged (i.e., still being antenna state 11).

In the third round 56c, Client #1, Client #2, and Client #3 are removed successively as described above with reference to FIG. 11. After Client #3 is removed from the idle client list, only Client #4 and Client #5 remain on the idle client list. Initial receiver antenna state 58 is set as the next antenna state for Client #4, which is antenna state 1 at this juncture. As a result, antenna states 1-5 are covered for Client #4. Then initial receiver antenna state 58 is set as the next antenna state for Client #4, which is antenna state 6 at this juncture. As a result, antenna states 6-10 are covered for Client #5. Initial antenna state 58 is unchanged (i.e., still being antenna state 6).

Subsequently in the fourth round 56d, antenna states 6-10 are covered for Client #4. Then Client #4 is removed from the idle client list as all antenna states 1-15 have been covered for Client #4, and only Client #5 remains on the idle client list. Initial receiver antenna state 58 is set as the next antenna state for Client #5, which is antenna state 1 at this juncture. As a result, in the fourth round 56d, antenna states 1-5 are covered for Client #5. Client #5 is removed from the idle client list. Because Client #5 is the last client in the idle client list, there is no need to set initial receiver antenna state 58. As such, Client #1, Client #2, Client #3, Client #4, and Client #5 have all been sounded, and the process ends.

Implementations of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, implementations of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain implementations of the disclosure have been described, other implementations may exist. Furthermore, although implementations of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with implementations of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, implementations of the disclosure may be practiced in an electrical circuit comprising discrete electronic elements, packaged or integrated electronic chips containing logic gates, a circuit utilizing a microprocessor, or on a single chip containing electronic elements or microprocessors. Implementations of the disclosure may also be practiced using other technologies capable of performing logical operations such as, for example, AND, OR, and NOT, including but not limited to mechanical, optical, fluidic, and quantum technologies. In addition, implementations of the disclosure may be practiced within a general purpose computer or in any other circuits or systems.

Implementations of the present disclosure, for example, are described above with reference to block diagrams and/or operational illustrations of methods, systems, and computer program products according to implementations of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for implementations of the disclosure.

What is claimed is:

1. A method comprising:
    receiving, in a block based modulation environment, one or more packets from a client at one or more switchable antennas of an access point, the access point having a plurality of switchable antennas, each switchable antenna having an antenna state;
    switching among the plurality of switchable antennas such that at least five of the antenna states are sampled wherein switching among the plurality of switchable antennas such that the at least five of the antenna states are sampled comprises:
        receiving, at the access point, a bitmap from a host, the bitmap indicating one or more antenna states that have not been sampled for the client; and
        switching to sample the one or more antenna states that have not been sampled for the client; and
    calculating angle of arrival of the client based on the at least five of the antenna states.

2. The method of claim 1, wherein switching among the plurality of switchable antennas such that the at least five of the antenna states are sampled comprises:
    randomizing a starting antenna state of an antenna switching cycle such that the at least five of the antenna states are sampled.

3. The method of claim 1, wherein switching among the plurality of switchable antennas such that the at least five of the antenna states are sampled further comprises:
    determining that, in the first antenna switching cycle, a starting antenna state is a next antenna state of an ending antenna state.

4. The method of claim 1, wherein switching among the plurality of switchable antennas such that the at least five of the antenna states are sampled comprises:
    determining that a second packet received from the client follows a first packet sent by the access point by a predetermined period; and
    switching to sample one or more antenna states that have not been sampled.

5. The method of claim 4, wherein the predetermined period is sixteen microseconds.

6. The method of claim 1, wherein the bitmap is sent to the access point as a push command.

7. The method of claim 1, wherein the bitmap is polled, by the access point, from the host.

8. The method of claim 1, further comprising:
    receiving, in the block based modulation environment, one or more packets from an additional client;
    switching among the plurality of switchable antennas such that at least five of the antenna states are sampled for the additional client; and
    calculating angle of arrival of the additional client based on the at least five of the antenna states.

9. The method of claim 8, wherein the bitmap indicating one or more antenna states that have not been sampled for the additional client, and switching among the plurality of switchable antennas such that the at least five of the antenna states are sampled for the additional client comprises:

setting an initial receiver antenna state for the additional client as a next antenna state for the client, based on the bitmap; and sampling the one or more antenna states that have not been sample for the additional client, starting with the initial receive antenna state.

10. The method of claim 1 further comprising:

identifying a location of the client based on the angle of arrival.

11. The method of claim 1, wherein the block based modulation environment comprises a Wi-Fi network.

12. The method of claim 1, wherein the each of the one or more packets comprises a Physical Layer Convergence Protocol (PLCP) Protocol Data Unit (PPDU).

13. The method of claim 1, wherein a first antenna state is sampled when a block acknowledgement (BA) is sent on a first switchable antenna corresponding to the first antenna state.

14. An access point comprising:

a plurality of switchable antennas, each switchable antenna having an antenna state;

an antenna switch configured to switch among the plurality of switchable antennas;

a memory; and a processing unit coupled to the memory, wherein the processing unit is operative to perform a method comprising:

receive, by one or more of the plurality of switchable antennas, one or more packets from a client in a block based modulation environment;

switch, by the antenna switch, among the switchable antennas such that at least five of the antenna states are sampled wherein switching among the plurality of switchable antennas such that the at least five of the antenna states are sampled comprises offsetting a starting antenna state of a second antenna switching cycle such that the at least five of the antenna states are sampled, the second antenna switching cycle following a first antenna switching cycle; and calculating angle of arrival of the client based on the at least five of the antenna states.

15. The access point of claim 14, wherein the block based modulation environment comprises a Wi-Fi network.

16. The access point of claim 14, wherein the each of the one or more packets comprises a Physical Layer Convergence Protocol (PLCP) Protocol Data Unit (PPDU).

17. A non-transitory computer readable medium that stores a set of instructions which when executed perform a method executed by the set of instructions comprising:

receiving, in a block based modulation environment, one or more packets from a client at one or more switchable antennas of an access point, the access point having a plurality of switchable antennas, each switchable antenna having an antenna state;

switching among the plurality of switchable antennas such that at least five of the antenna states are sampled wherein switching among the plurality of switchable antennas such that the at least five of the antenna states are sampled comprises:

receiving, at the access point, a bitmap from a host, the bitmap indicating one or more antenna states that have not been sampled for the client; and switching to sample the one or more antenna states that have not been sampled for the client; and calculating angle of arrival of the client based on the at least five of the antenna states.

18. The non-transitory computer readable medium of claim 17, wherein the block based modulation environment comprises a Wi-Fi network.

19. The access point of claim 14, wherein switching among the plurality of switchable antennas such that the at least five of the antenna states are sampled further comprises:

determining that, in the first antenna switching cycle, a starting antenna state is a next antenna state of an ending antenna state.

20. The non-transitory computer readable medium of claim 17, wherein the bitmap is sent to the access point as a push command.

\* \* \* \* \*